J. McBRIDE.
Butter-Workers.

No. 139,723.  Patented June 10, 1873.

WITNESSES.

James McBride
INVENTOR.

UNITED STATES PATENT OFFICE.

JAMES McBRIDE, OF ITHACA, NEW YORK.

IMPROVEMENT IN BUTTER-WORKERS.

Specification forming part of Letters Patent No. 139,723, dated June 10, 1873; application filed March 11, 1873.

*To all whom it may concern:*

Be it known that I, JAMES MCBRIDE, of Ithaca, Tompkins county, New York, have invented an Improved Butter-Worker, of which the following is a specification:

My invention relates to that class of butter-workers which, by a lever, make pressure on the butter; and the nature of my invention will be apparent as I describe it.

Figure 1:
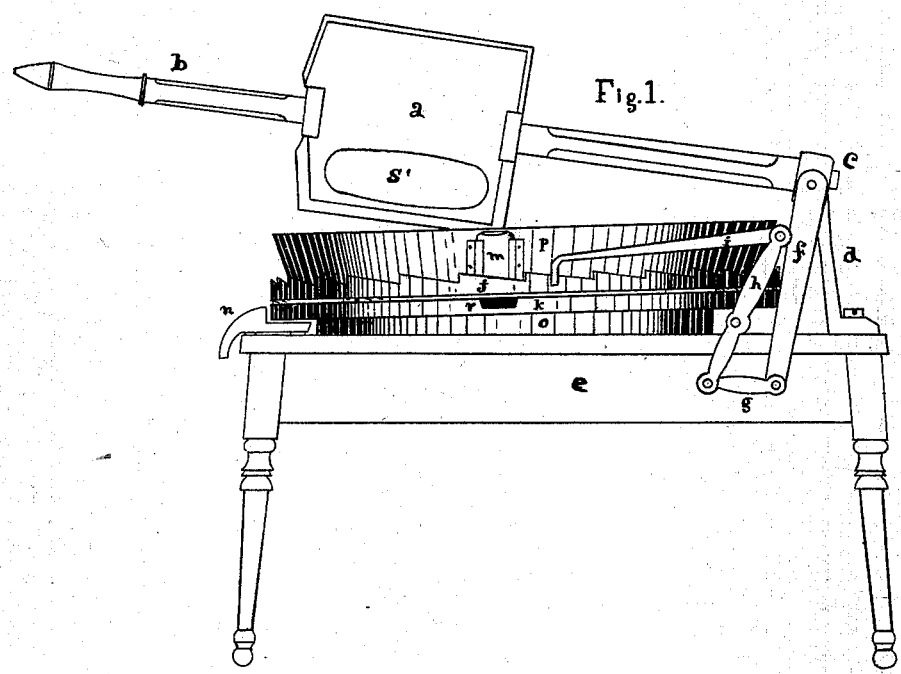
Figure 2:
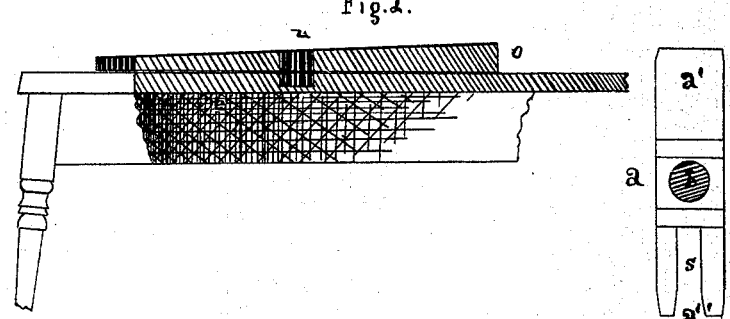

Figure 1 is a side elevation of my device; Fig. 2, a sectional view of the slope and table-top; and Fig. 3 an end view of my double-headed presser.

In Fig. 1, $a$ is the double-headed presser, with the side aperture $s'$ in its lower half or head, either end or head of which can be turned downward by changing the lever $b$, upon which it is, in its socket in the shaft $c$, which shaft is held by the standard $d$, and which shaft has on one end of it the arm $f$, which at its lower end is pivoted to the connecting-rod $g$, and which rod is pivoted to the lever $h$, and which lever is pivoted to the clutch $i$, and which clutch plays in the teeth of the circular ratchet $j$, and is fast to the bottom $k$ of the circular pan $p$. This bottom has two butter-milk-ducts, $r$, one of which is seen in the figure, and which empties at proper times into the spout $n$, which is fast to the table $e$. Beneath the pan-bottom is the inclined piece or part $o$, sloping toward the spout $n$, and this incline or slope rests on the table. The pan is circular and beveled outward, and has two gates, $m$, one of which is seen.

Figure 3:
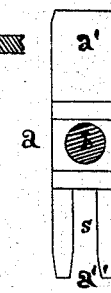

The butter is placed in the pan, and the upper part of the presser $a'$ is first used, and by it the butter is partially worked, when the lower part of the presser $a''$, having the longitudinal aperture $s$ and the transverse one $s'$ in it, is used. The division is seen in Fig. 3. It will be noticed that when the lever $b$ is raised moderately, the arm, connecting-rod, lever $h$, and clutch rotate the pan, thus bringing a new portion of butter under the presser, and that this goes on as often as the lever is lifted. The pan $p$ has a pin or journal that fits the socket $u$, Fig. 2, in the incline or slope $o$ on which it rotates.

Further description is unnecessary, as the uses and advantages of my invention are apparent to those skilled in the art to which it appertains.

I claim—

1. The double-headed presser $a$, with divisions $s$, in combination with the lever $p$ socketed in and oscillating the shaft $c$, substantially as set forth.

2. The double-headed presser $a$, with one head, $a'$, solid, and the other head, $a''$, with a longitudinal division, $s$, and two transverse apertures, $s'$, one through each division of the head $a''$, as set forth.

3. The lever $b$, shaft $c$, arm $f$, rod $g$, lever $h$, and click $i$, in combination with the pan $p$, pivoted and attached to the slope $o$, and secured to the bed-piece or table $e$, substantially as set forth.

JAMES McBRIDE.

Witnesses:
S. J. PARKER,
A. M. LUCAS.